April 5, 1966  J. S. ZUCKERBRAUN  3,244,060
SCANNING DEVICE FOR LIGHT TRACKING SYSTEMS
Filed May 22, 1961  2 Sheets-Sheet 2

INVENTOR.
JACOB S. ZUCKERBRAUN
BY
OSTROLENK FABER GERB & SOFFEN
ATTORNEYS

United States Patent Office 3,244,060
Patented Apr. 5, 1966

3,244,060
SCANNING DEVICE FOR LIGHT
TRACKING SYSTEMS
Jacob S. Zuckerbraun, New York, N.Y., assignor to Kollsman Instrument Corporation, Elmhurst, N.Y., a corporation of New York
Filed May 22, 1961, Ser. No. 111,745
1 Claim. (Cl. 88—1)

This invention relates to a shutter arrangement for light tracking devices of the type shown in U.S. Patent No. 2,905,828 to O'Maley et al., assigned to the assignee of the present invention, and more specifically relates to an improvement of the shutter arrangement shown in my copending application Serial No. 71,248 filed November 23, 1960, now U.S. Patent No. 3,178,579, entitled "Tuning Fork Scanner," and assigned to the assignee of the present invention. More specifically, the improvement of the present invention lies in the use of a single tuning fork drive mechanism for moving both an azimuth scanning aperture and an altiutde scanning aperture.

Light tracking systems to which the invention is applied are well known in the art, and are typically illustrated in the above noted U.S. Patent 2,905,828. One of the essential elements in such tracking systems is in the scanning means which scans the light received by the source being tracked in order to determine how the system is to be moved so that it will remain in alignment with the light source being tracked.

Many types of scanning mechanisms have been proposed, and are shown, for example, in my copending application Serial No. 77,198 filed December 20, 1960, now abandoned, entitled "Scanning Device for Light Tracking Systems" and my above noted application Serial No. 71,248 entitled "Tuning Fork Scanner," each of which are assigned to the assignee of the present invention.

In addition, copending application Serial No. 77,654 filed December 20, 1960, now U.S. Patent No. 3,135,869, in the name of Rosenthal, entitled "Scanning System for Light Tracking Device" and assigned to the assignee of the present invention shows a still further type of scanning mechanism.

Where the tuning fork concept of Serial No. 71,248 is employed to cause the oscillation of an aperture through the image of a source being tracked, it has been necessary, when the concept of any of the above systems is used, to use a first tuning fork driven aperture for scanning in azimuth and a second tuning fork driven aperture for scanning in altitude.

In accordance with the present invention, I have found that I can use a common tuning fork for driving each of the apertures. In a preferred embodiment of the invention, a slotted plate is carried at each end or on each tine of a common tuning fork. Each of the plates has a slot therein where the slots of the two plates are 90° with respect to one another. Each plate is caused to move with respect to a respective stationary plate which has its own respective slot which is rotated at 90° from the direction in which the slot in its respective vibrating plate is placeed. Thus, during the vibration of each tine, the movement of the intersection of the slot in the movable plate and the slot in its respective stationary plate will define a sweeping aperture where the apertures of the two vibrating systems will move along lines which are 90° displaced with respect to one another.

If now, the image of the light source bing tracked is focused through an appropriate light splitting means upon each of these vibrating apertures, the image can be tracked simultaneously in both azimuth and altitude by a scanning system which requires only a single tuning fork.

Accordingly, a primary object of this invention is to provide a novel light scanning mechanism.

Another object of this invention is to provide a novel light scanning mechanism for light tracking systems wherein a single tuning fork having aperture forming plates at each of its tines provides simultaneous azimuth and altitude tracking.

Another object of this inventon is to cause each tine of a single tuning fork in a light tracking system to cause oscillation of respective apertures in quadrature to one another.

These and other objects of this inventon will become apparent from the following description when taken in connection with the drawings in which.

Figure 1:
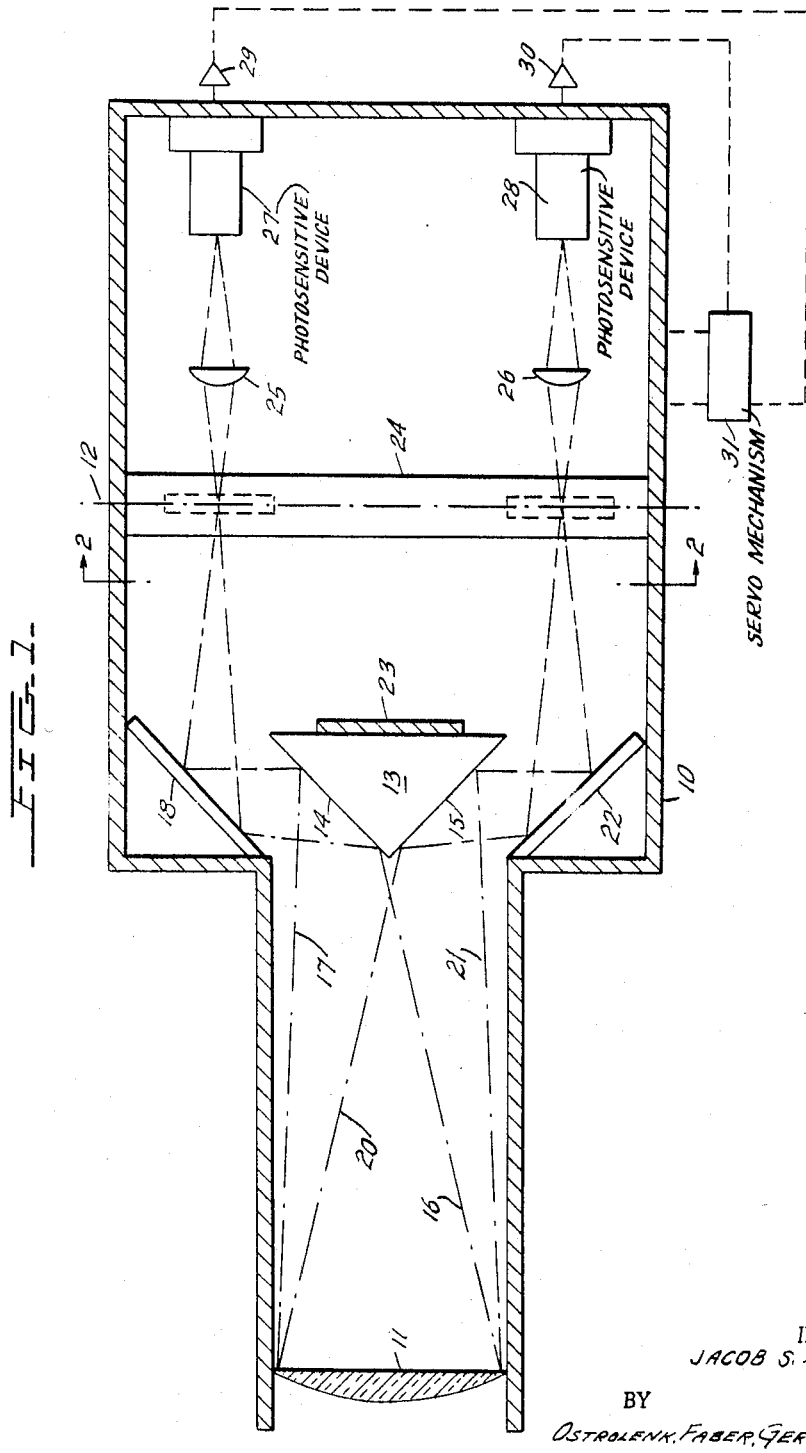
FIGURE 1 shows a side cross-sectional view of a telescope incorporating a novel single tuning fork of the invention for driving both an azimuth and altitude aperture simultaneously.

Referring now to FIGURE 1, I have shown therein a telescope housing 10 having an objective 11 which focuses the image of a light source which is to be tracked on a focal plane 12. More specifically, in FIGURE 1, the light collected by objective 11 is directed to an image splitting prism 13 which has totally reflecting surfaces 14 and 15 respectively.

Light rays such as light rays 16 and 17 impinging on surface 14 are reflected to a reflecting mirror 18 which is parallel to surface 14, and directs beams 16 and 17 on focal plane 12, as illustrated. In a similar manner, beams 20 and 21 impinged on surface 15 are reflected by a reflecting mirror 22 which directs rays 20 and 21 again to focal plane 12.

It is to be noted that mirrors 18 and 22 and prism 13 will be supported from housing 10 in any desired manner where, for example, prism 13 may be secured to a post 23 extending from housing 10.

The scanning mechanism of the invention, contained within a housing 24, as schematically illustrated, then intercepts the focused beams coming from surfaces 14 and 15 of the prism, and scans these beams in the usual manner, as is fully illustrated, for example, in my above noted copending application Serial No. 71,248. This scanning mechanism, which is the subject of the present invention, will be described more fully hereinafter.

After the scanning operation is complete, the light beam is passed to lens sytems 25 and 26 which then focus the light upon photosensing elements 27 and 28 respectively. The outputs of mechanism 27 and 28 are then amplified by amplifiers 29 and 30 respectively to drive an appropriate servo mechanism 31 which is secured, as illustrated by dotted lines to housing 10, whereby the housing 10 is continually pointed toward the light source to be tracked in accordance with the signals delivered by amplifiers 29 and 30.

Figure 2:
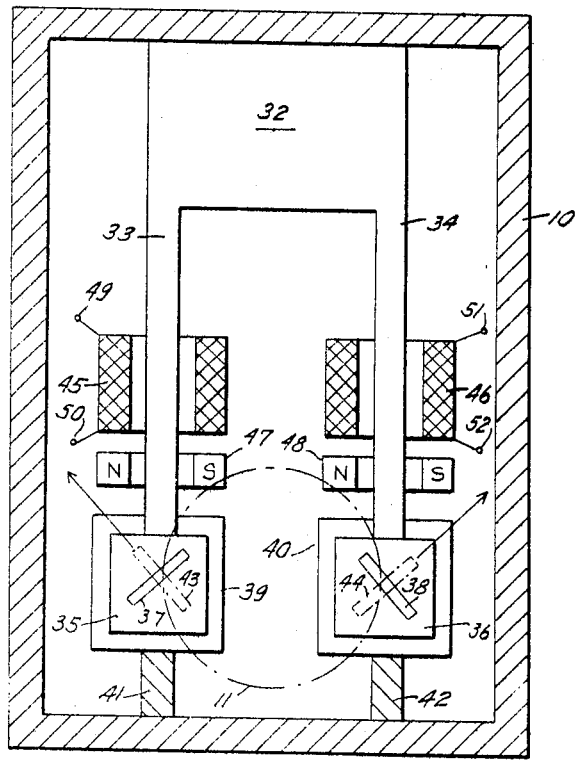
FIGURE 2 is a cross-sectional view of FIGURE 1 taken along lines 22 of FIGURE 1, and specifically illustrates the novel scanning mechanism of the invention.

The specific scanning mechanism 24 of the invention is best illustrated in FIGURE 2. Referring now to FIGURE 2, and in accordance with the invention, I provide a tuning fork 32 which is secured to housing 10 and has projecting tines 33 and 34 which will oscillate at some resonant frequency determined by the fork construction.

Figure 3:
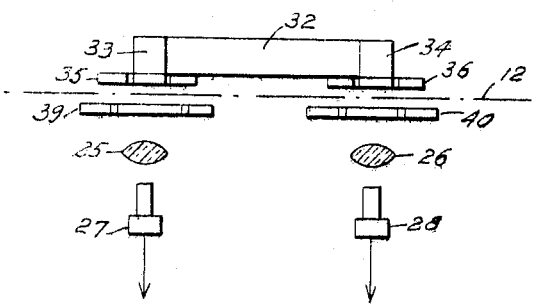
FIGURE 3 is a top view of the scanning mechanism of FIGURE 2, and illustrates the relative placement of the vibrating plates and stationary plates of the scanning system.

The ends of tines 33 and 34 are then rigidly connected to plates 35 and 36 respectively, as shown in both of FIGURES 2 and 3. Each of plates 35 and 36 have slots 37 and 38 therein which are perpendicular to one another. Stationary plates 39 and 40 are then positioned behind plates 35 and 36 respectively and, for example, may be secured to housing 10, as illustrated by posts 41 and 42 respectively. Each of plates 39 and 40 are immediately adjacent vibrating plates 35 and 36, and have slots 43 and 44 which are perpendicular to the slots of their respective vibrating plate. The slots 37, 38, 43 and 44 are each at a 45° angle with respect to the axis of their respective tine.

The plates 35 and 36 are caused to vibrate from side to side in FIGURE 2 by a driving system which includes drive coils 45 and 46 for tines 33 and 34 respectively, and permanent magnets 47 and 48 for tines 33 and 34 respectively. Coils 45 and 46, and magnets 47 and 48, are supported independently of tines 33 and 34, as by any appropriate support means extending from housing 10.

In operation, terminals 49 and 50 of coil 45 and terminals 51 and 52 of coil 46 are connected to some appropriate source of voltage, whose frequency is preferably at the resonant frequency of tines 33 and 34.

An alternating magnetic flux is, therefore, set up in each of tines 33 and 34 which will alternately aid and oppose the influence of permanent magnets 47 and 48 respectively, whereby each of the tines will be caused to oscillate at the frequency of excitation of coils 45 and 46. Thus, the plates 35 and 36 will be caused to oscillate from right to left in FIGURE 2.

As plate 35 oscillates, it will be observed that the square aperture defined by the intersection between slot 37 and slot 43 will apparently oscillate along the direction of slot 43. Similarly, oscillation of plate 43 will cause the square shaped aperture defined by the intersection of slots 38 and 44 to oscillate along the length of slot 44.

In FIGURE 2, the direction of oscillation of the aperture defined by vibrating plate 35 is denoted as direction $u$, while the other square shaped aperture defined in part by slot 44 will oscillate in a direction $v$. Because of the geometry of the system, it is readily apparent that axis $u$ is at 90° to axis $v$, whereby the light beam focused upon plate 35 will be scanned in azimuth, while the light beam focused upon plate 36 will be scanned in altitude.

Accordingly, the novel invention provides means whereby the image of the source being tracked can be simultaneously scanned in both azimuth and altitude by a scanning means which requires only a single tuning fork.

The operation of the system and the manner in which signals are derived from this scanning operation are fully set forth, for example, in my application Serial No. 77,198, and are not necessary to the understanding of the present invention which is specifically directed to the scanning mechanism per se. Generally, however, and considering scanning only in the direction $u$, assuming that the tracking device is directly in line with the light source to be tracked, the image of the light source will be directly upon the center of plate 35 when plate 35 is in its "rest" position.

For most effective daylight star tracking, the aperture defined by slots 37 and 43 should not be larger than the image of the source being tracked so that background light and its attendant noise effects are restricted.

Assuming now that the light source is directly aligned, the square shaped scanning aperture will interrupt this light source at twice the frequency at which plate 35 vibrates. Thus, a double frequency output is generated, for example, in light sensing device 27, which information is used to indicate appropriate azimuth alignment. If, now, the light source moves off of its aligned position, and along the $u$ direction, the light source will now be interrupted at the frequency of oscillation of plate 35, whereby this information generated in photosensing means 27 indicates to the servo mechanism 31 that a correction in alignment must be made. The sense of this correction depends upon whether the light source has moved upwardly along the $u$ axis or downwardly along the $u$ axis, which would determine the phase relationship of the generated signal with resepct to some fixed phase so that the servo mechanism can know in which direction the correction is to be made.

In a similar manner, scanning is achieved along the $v$ axis which can be an altitude axis for the mechanism.

The above embodiment of the invention operates satisfactorily where bright backgrounds are present as in daylight tracking. If a star is to be tracked against a dark background however, the fixed plates 39 and 40 may be removed and the slot width of slots 37 and 38 can be enlarged to give a wide field scan.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claim.

What is claimed is:

In a light tracking device for tracking a remote light source; means for forming spaced first and second images of said remote light source; a tuning fork having a first and second tine; means connected to said tuning fork to vibrate said first and second tines; first and second scanning means adjacent said first and second images; each of said first and second scanning means comprising fixed members having slots therein and cooperating movable members having slots therein and mounted on a respective tine of said tuning fork; said slots in said fixed members being angularly related to the direction of movement of the said respective movable members and in quadrature relation to each other; said slots in said movable members each being in quadrature relation to said slot in their said respective fixed members.

References Cited by the Examiner

UNITED STATES PATENTS

| | | | |
|---|---|---|---|
| 1,631,021 | 5/1927 | Dowling | 250—232 X |
| 1,842,759 | 1/1932 | Malm | 88—61 X |
| 1,958,071 | 5/1934 | Scofield | 88—61 |
| 2,923,202 | 2/1960 | Trimble | 250—203 |
| 2,997,588 | 8/1961 | Wilcox | 88—1 |

JEWELL H. PEDERSEN, *Primary Examiner.*

EMIL G. ANDERSON, *Examiner.*